United States Patent [19]

Price, Jr. et al.

[11] Patent Number: 5,286,103
[45] Date of Patent: Feb. 15, 1994

[54] MOBILE CART FOR TRANSPORTING TAPE CARTRIDGE STORAGE PACKS AND METHOD THEREFORE

[75] Inventors: Macy J. Price, Jr., Louisville; Timothy J. Pickles, Brighton, both of Colo.

[73] Assignee: Engineered Data Products, Inc., Broomfield, Colo.

[21] Appl. No.: 969,477

[22] Filed: Oct. 30, 1992

[51] Int. Cl.⁵ ....................... A47B 81/00; A47B 49/00
[52] U.S. Cl. ................................. 312/9.46; 312/249.2; 312/249.8; 211/163; 211/131
[58] Field of Search ............... 312/9.46, 9.45, 249.2, 312/249.6, 249.8, 305; 206/387; 211/163, 131, 126

[56] References Cited

U.S. PATENT DOCUMENTS

| | | | |
|---|---|---|---|
| 4,643,496 | 2/1987 | Dahl | 312/305 |
| 4,688,860 | 8/1987 | Accumanno et al. | 312/125 |
| 4,730,735 | 3/1988 | Lechner | 211/126 |
| 4,844,564 | 7/1989 | Price, Sr. et al. | 206/387 |
| 4,971,199 | 11/1990 | Price, Jr. et al. | 206/387 |
| 5,158,345 | 10/1992 | Baur | 312/9.46 |

Primary Examiner—P. W. Echols
Assistant Examiner—David P. Bryant
Attorney, Agent, or Firm—Glenn L. Webb

[57] ABSTRACT

A carousel cart for efficiently transporting tape cartridge packs. A wheeled cart includes a rotatable housing unit. The housing unit includes a plurality of peripheral recesses. Engaging members extend angularly upward and outward from the rear wall of each of the recesses. A guide surface is attached to the rear and upper wall of each of the recesses. Tape cartridge storage packs having rear engaging slots are inserted into the recesses so the slots engage the engaging members.

The design of the present invention enables the tape cartridge packs to be transported in a compact carousel cart. This allows access in crowded conditions as typically occurs. The tape cartridge packs are securely held in the recesses.

13 Claims, 4 Drawing Sheets

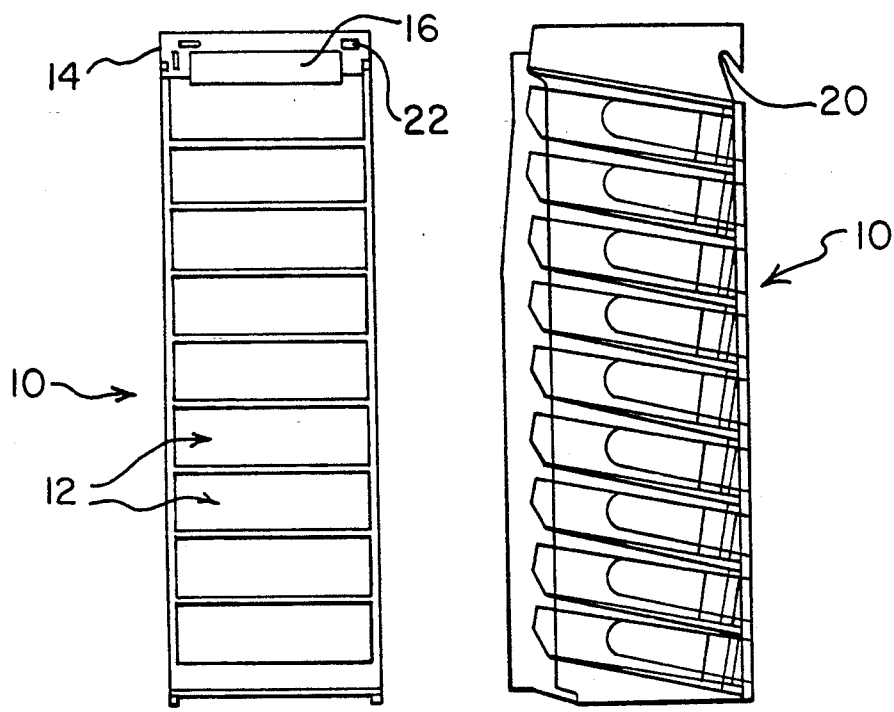
FIG. 1A
PRIOR ART
FIG. 1B
PRIOR ART
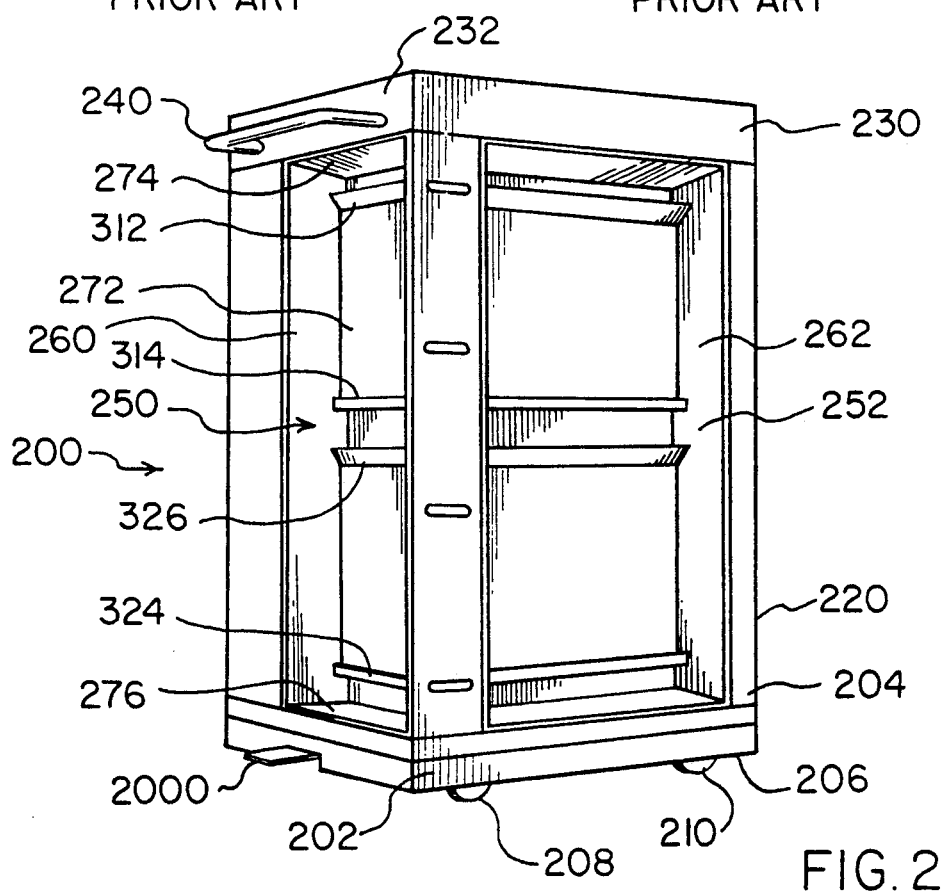
FIG. 2

MOBILE CART FOR TRANSPORTING TAPE CARTRIDGE STORAGE PACKS AND METHOD THEREFORE

BACKGROUND OF THE INVENTION

1. Field of the Invention

This invention relates to the field of mobile carts and particularly to the field of mobile carts for transporting tape cartridge storage packs.

2. Statement of the Problem

Automatic tape cartridge libraries are often utilized in information processing centers. Data tape cartridges must frequently be loaded and unloaded into these libraries. The tape cartridge library loading and unloading operations normally use tape cartridge packs which hold ten to twenty tape cartridges. The tape cartridge packs enable the tape cartridges, such as 3480/3490-style tape cartridges, to be moved more easily in large quantities as well as maintain the cartridges in a selected order.

The tape cartridge packs, such as the ten-pack distributed by Storage Technology, Inc., Louisville, Colo. for use in the Storage Technology, Inc. Automated Cartridge Library System, must still be transported to and from the library systems. These library systems typically have limited aisle space surrounding them. Therefore the size of the carts used in transporting these tape cartridge packs is limited. Also, the access to the tape cartridge packs on the carts is limited as well. Additionally, the tape cartridge packs must be supported in a stable manner to prevent accidental spillage. Damage to the tape cartridges can result in loss of critical data.

Prior tape cartridge mobile carts, such as the tape cartridge truck disclosed in U.S. Pat. No. 4,688,860; U.S. Pat. No. Des. 299,577; and U.S. Pat. No. Des. 300,072; all assigned to Engineered Data Products, Inc., Broomfield, Colo., use shelves to contain rectangular-shaped tape cartridge packs. While suitable for use in transporting some styles of tape cartridge packs, these trucks are unable to adequately transport certain styles of tape cartridge packs.

One such style of tape cartridge pack that can not be adequately transported by the prior trucks is the above-described tape cartridge pack distributed by Storage Technology Inc. This particular style of tape cartridge pack stores ten cartridges in vertical alignment. These packs are inserted directly into a port of the Automated Cartridge Library System. This minimizes the problems and time of loading individual tapes into the system. However, at present there is no efficient process for transporting these or other similarly styled packs to the tape storage area or to tape cartridge library systems.

These tape cartridge packs are at present carried by hand or loaded into shopping cart-style carts when being stored or loaded into a library system. This handling leads to damage to the tape cartridges and to disorganized ordering of the tape cartridges. The existing carts are unable to securely and efficiently handle this style of packs.

Thus, a problem exists in the inability to easily and efficiently transport tape cartridge packs to tape cartridge library systems or other storage facilities.

SUMMARY OF THE INVENTION

The present invention solves this problem and others by providing a compact cart that efficiently transports tape cartridge packs. A preferred embodiment of the present invention includes a cart having a base unit mounted on wheels. An upright side panel is secured on the base unit with an upper panel extending perpendicularly from the upper portion of the side panel. A housing unit is rotatably mounted between the upper panel and the base unit.

The housing unit is formed from a plurality of compartment members. Each compartment member includes a recess with at least two engaging members extending across the width of the recess and vertically spaced from one another. The engaging members extend angularly upward and outward from the rear wall of the recesses. Abutment members are affixed to the recess below each of the engaging members. A guide surface is attached to the rear and upper wall of each of the recesses. Slots are formed in one of the exterior surface of each of the compartment members.

The compartment members are secured together to form the housing unit having the recesses along its periphery. Tape cartridge storage packs having rear engaging slots are inserted into the recesses so the slots engage the engaging members. The upper guide surfaces enable the tape cartridge packs to easily engage onto the engaging members. The abutment members maintain the tape cartridge packs vertically aligned. The depth of the recesses are designed so that the tape cartridge packs can be fully inserted without damage to the person handling the tape cartridges hands.

Certain styles of these tape cartridge packs use straps to prevent spilling of the tape cartridges. These straps can be engaged in the slots on the surface of the compartment members.

The design of the present invention enables the tape cartridge packs to be transported in a compact carousel cart. This allows access to the tape cartridge packs in crowded conditions. The tape cartridge packs are securely held in the recesses.

Other embodiments of the present invention include a non-carousel cart. This embodiment uses a wheeled base unit with an upright center support member. The engaging members and abutment members are affixed to the sides of the center support member. This allows tape cartridges packs to be loaded side by side and on opposite sides of the center support member in a narrow cart.

A third embodiment includes a stand-alone carousel for storing tape cartridge packs. This carousel is similar to the carousel cart. The rotatable housing unit of this carousel is formed in a similar fashion from a plurality of compartment members. Each of the compartment members have recess with internal engaging members. This carousel is used for compact storage of the tape cartridge packs.

These and other features of the present invention are evident from the ensuing detailed description of preferred embodiments and from the drawings.

BRIEF DESCRIPTION OF THE DRAWINGS

FIG. 1(*a*) is a front view of a prior art tape cartridge pack for use with the present invention.

FIG. 1(*b*) is a side view of a prior art tape cartridge pack for use with the present invention.

FIG. 2 is a perspective view of a carousel cart of a preferred embodiment of the present invention.

DETAILED DESCRIPTION OF THE PREFERRED EMBODIMENT

Figure 3:
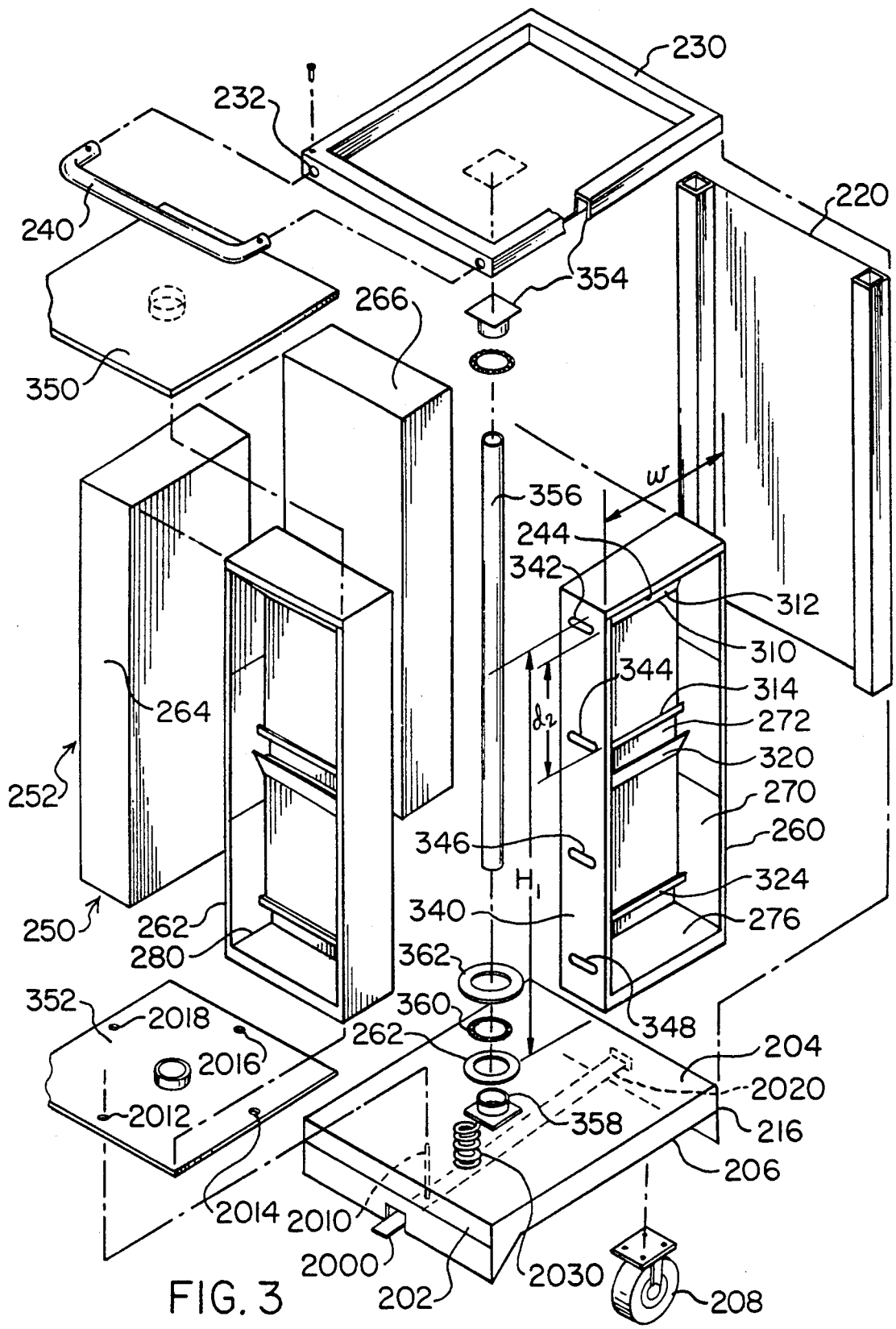
FIG. 3 is an exploded assembly view of the embodiment of FIG. 2.

The present invention provides a tape cartridge pack transportation system. In a preferred embodiment, the system includes a mobile carousel cart that provides efficient transporting of tape cartridge packs in limited spaces. It is to be expressly understood that the descriptive embodiment is provided for explanatory purposes and is not meant to limit the scope of the inventive concept. Other embodiments and variations fall within the limits of the present invention.

The present invention has particular utility with prior art tape cartridge storage pack 10 illustrated in FIGS. 1(a) and 1(b). The present invention is not to be limited to this particular style of tape cartridge storage pack nor does the described storage pack fall within the present invention. The tape cartridge storage pack described herein is manufactured by Storage Technology, Inc., Louisville, Colo. This particular tape cartridge storage pack 10 is a rectangularly-shaped structure holding up to ten cartridges in vertical alignment. The tape cartridges C are held in downwardly angled slots 12 under the force of gravity. Upper portion 14 of pack 10 includes handle 16 for carrying pack 10 and for loading and unloading pack 10 into the storage cart and library system. Upwardly-angled slot 20 is formed in the rear portion of pack 10. Strap 30, in FIG. 1(b), engages slots 22, 24 on pack 10 to prevent accidental dislodgement of tape cartridges C from slots 12.

A preferred embodiment of the present invention is illustrated in FIGS. 2-5. Mobile carousel cart 200, shown in FIGS. 2 and 3, includes base unit 202 having upper surface 204 and lower surface 206. Wheels 208, 210, 212, 214 (all of which are not shown) are secured on lower surface 206 of base unit 202 by screws or other well known attachments. In the preferred embodiment, base unit 202 is rectangular-shaped. Side panel member 220 is affixed on upper surface 204 of base unit 202 perpendicularly aligned with front edge surface 216. Upper panel member 230 is perpendicularly affixed to side panel member 220 by well known attachments, such as screws or spot welding. Handle 240 is fastened to side surface 232 of upper panel member.

Carousel 250 is rotatably mounted between upper panel member 230 and base unit 202 as described in detail below. Carousel 250 includes housing unit 252 for engaging tape cartridge packs 10 described above. Compartment members 260, 262, 264, 266, shown in FIG. 3, are affixed together to form housing unit 252. Compartment members 260-266 include recesses 270, 280, 290, 300, respectively (all of which are not shown). Each compartment member is similar so only compartment member 260 will be described in detail.

Recess 270, shown in FIG. 3, formed in compartment member 260 includes rear wall 272, upper surface 274 and lower surface 276. Recess 270 extends a height "$H_1$", width "$W_1$" and depth "$D_1$". These dimensions are selected according to the dimensions of the tape cartridge pack to be inserted therein as described below. Upper engaging member 310 extends across the width of recess 270. Engaging member 310, shown in FIGS. 3-5, extends upwardly outward at an angle substantially identical to the angle of upper slot 20 of tape cartridge pack 10. Reinforcing rib 312 is affixed between engaging member 310 and rear wall 272 to provide support for engaging member 310. Reinforcing rib 312 also provides an abutment surface for engaging slot 20 of tape cartridge pack 10.

Abutment member 314 is formed across recess 270 vertically spaced a distance "$d_1$" from engaging member 310. Abutment member 314 extends outwardly form rear wall 272 a distance "$w_1$". This distance compensates for the engagement of slot 20 of tape cartridge pack 10 with engaging member 310 to hold tape cartridge pack 10 substantially vertically when inserted into recess 270.

Lower engaging member 320 extends across the width of a lower portion of recess 270. Engaging member 320 is spaced vertically a distance "$d_2$" from and parallel to engaging member 310. Engaging member 320 extends angularly outward from rear wall 272 similar to engaging member 310. Reinforcing rib 322 is affixed between engaging member 320 and rear wall 272 to provide reinforcement as well as an abutment surface as described above.

Abutment member 324 is formed across recess 270 vertically spaced a distance "$d_2$" from engaging member 320. Abutment member 324 extends outwardly form rear wall 272 a distance "$w_1$". As described above, this distance compensates for the engagement of slot 20 of tape cartridge pack 10 with engaging member 320 to hold tape cartridge pack 10 substantially vertically when inserted into recess 270.

Figure 4:
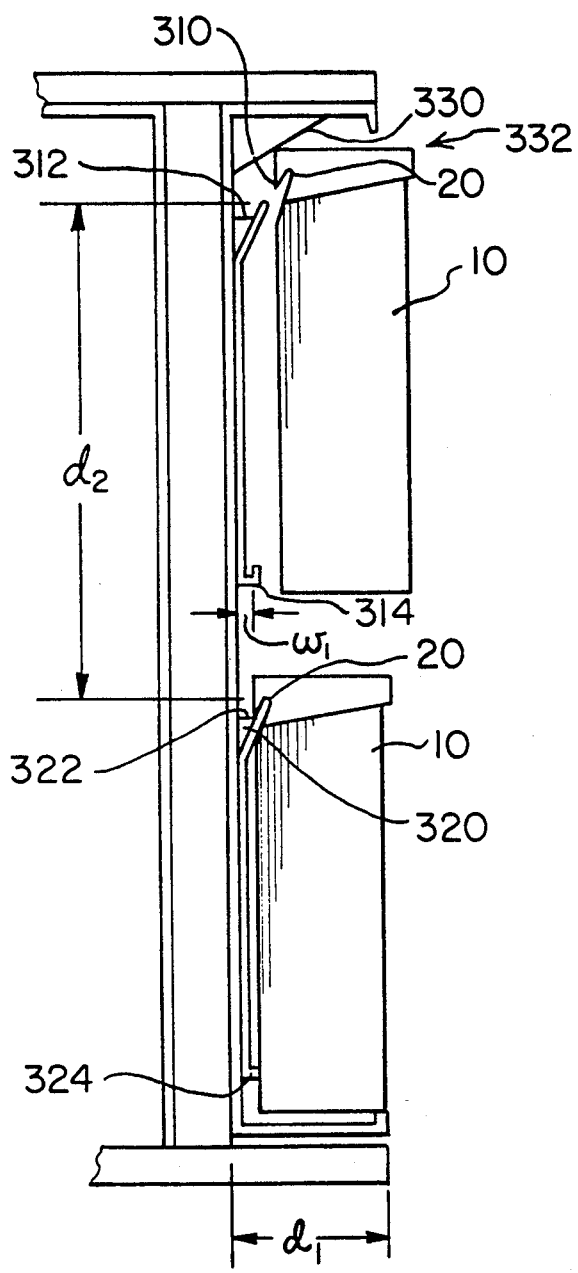
FIG. 4 is a cutaway view of a tape cartridge pack being loaded into the carousel truck of FIG. 2.
Figure 5:
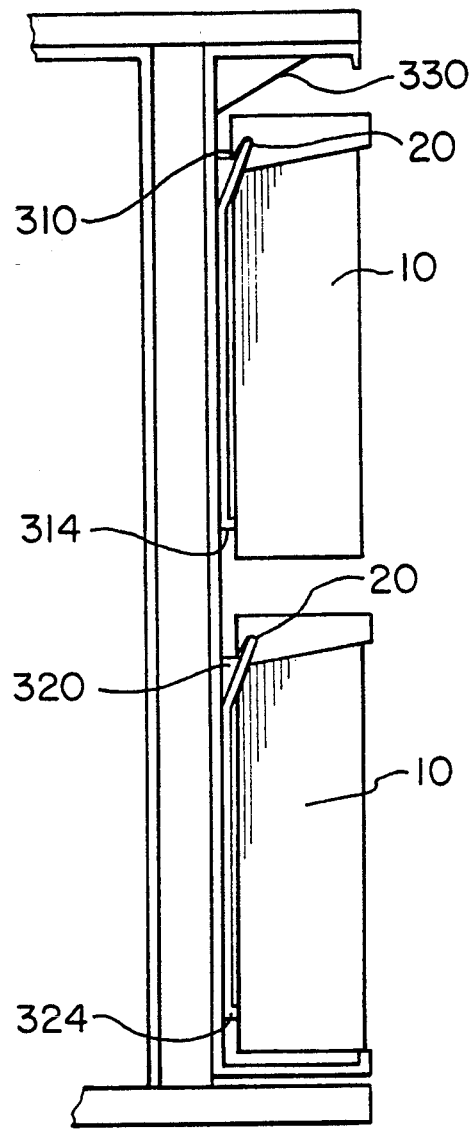
FIG. 5 is a cutaway view along lines 5—5 of FIG. 2.

Guide surface 330, shown in FIGS. 4 and 5, extends angularly upward from rear surface 272 of recess 270 to mid-portion 278 of upper surface 274. As shown in FIG. 4, tape cartridge pack 10 is inserted in the upper portion of recess 270 in the direction of arrow 332. As the upper rear surface of tape cartridge pack 10 engages guide surface 330, slot 20 of tape cartridge pack 10 is guided into engagement with engaging member 310. This guiding action minimizes scraping of the hands of the person handling tape cartridge pack with compartment member 260. Tape cartridge packs do not require a guiding surface for insertion onto lower engaging member 320 since there is no housing surface that will interfere with the pack entry or retrieval.

The dimensions of recess 270 are selected to accommodate two tape cartridge packs side by side as well as two tape cartridge packs vertically stacked. Thus, each recess will accommodate four tape cartridge packs. The depth "$D_1$" of recess 270 is selected so that tape cartridge pack 10 will extend out of recess 270 sufficiently so handle 16 can be grasped without hands being scraped against the recess surfaces.

Compartment member 260 further includes exterior panel 340 on one side of recess 270. Exterior panel 340 includes vertically aligned slots 342, 344, 346, 348. Slots 342, 344 are spaced apart distance "$d_3$" for engaging strap 30 when strap 30 is not in use as do slots 346, 348.

Compartment members 262, 264, 266 are substantially identical to compartment member 260. Compartment members 260-266 are affixed together to form housing unit 252 having a plurality of recess 272 on the periphery of housing unit 252. Upper plate 350 and lower plate 352, shown in FIG. 3, are secured to compartment members 260-266. Upper bearing sleeve 354 is secured to upper plate 350 for engaging cylindrical rod 356. The lower end of rod 356 rotates within lower bearing sleeve 358. Needle roller bearing 360 is pressed onto rod 356 and mounted between flat washer plates 362, 364. Thus, housing unit 250 is able to rotate relative to base unit 202 and upper panel 230 about rod 356.

Stop pedal 2000 is affixed beneath base unit 202 by pivotal connection 2020. Pin 2010 affixed to stop pedal 2000 extends through base unit 202 to engage in one of holes 2012, 2014, 2016, 2018. Spring 2030 engages stop pedal 2000 to bias stop pedal upward for positive engagement between pin 2010 and holes 2012, 2014, 2016, 2018. This enables the carousel to be retained in a selected position. Stop pedal 2000 is depressed downward to allow the carousel to be pivoted.

In operation the mobile cart is compact so that it can be moved through narrow aisles. Tape cartridge packs can be inserted or retrieved into the recess of the housing unit. The housing unit can be swiveled as desired to provide access to a desired recess without requiring the cart to be manipulated.

Figure 6:
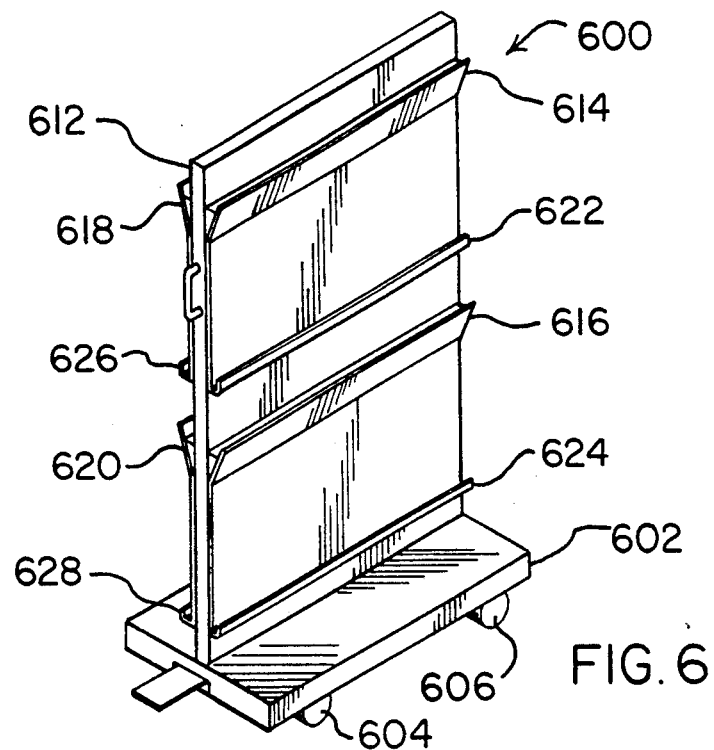
FIG. 6 is a perspective view of a cart of a second preferred embodiment of the present invention.

The present invention also includes various other preferred embodiments. One such embodiment is for transporting tape cartridge storage packs on a non-carousel cart. Cart 600, shown in FIG. 6, includes base unit 602 having wheels 604, 606, 608, 610 (all of which are not shown) affixed to the bottom thereof. Support member 612 extends perpendicularly upright along a center portion of base unit 602. Engaging members 614, 616, 618, 620 extend across the length of support member 612 on opposing sides of support member 612. Abutment members 622, 624, 626, 628 also extend across the length of support member 612 vertically spaced from engaging members 614–620, respectively.

Tape cartridge storage packs are loaded onto engaging members 614–620 in a side-by-side relationship and on opposing sides of center support member 612. This allows a narrow cart design for securely transporting these styles of tape cartridge holders.

Figure 7:
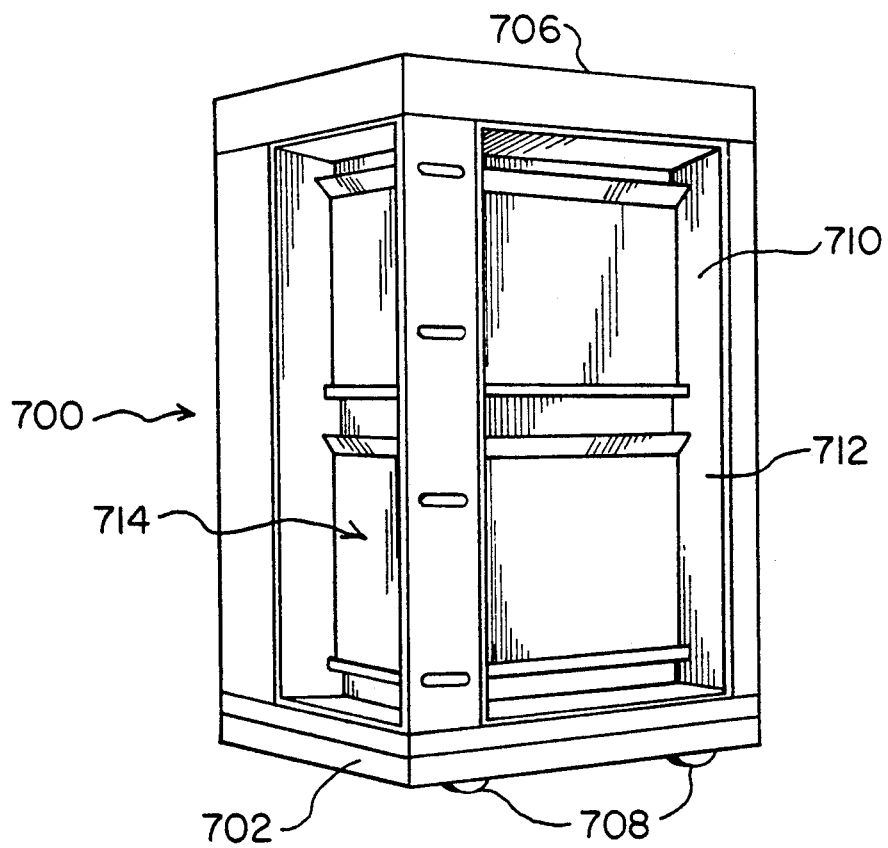
FIG. 7 is a perspective view of a carousel of a third preferred embodiment of the present invention.

A third embodiment uses the rotatable housing unit 260 described above as a stand-alone carousel. Carousel 700, shown in FIG. 7, includes base unit 702, side panel 704, and upper panel 706. Base unit 702 includes leveling feet 708 in lieu of wheels. Housing unit 710 is formed from compartment members 712, 714, 716, 718 (all of which are not shown) which are substantially similar to the above-described compartment members. Housing unit 710 is rotatably mounted between base unit 702 and upper panel 706 substantially identical to the above described housing unit 252. Thus, tape cartridge storage packs can be stored in carousel 700 in a compact and easily accessible fashion.

It is to be expressly understood that this descriptive embodiment is not meant to limit the scope of the claimed invention. Other embodiments and variations are considered to be within the inventive concept. For instance, the housing unit can be other shapes other than square. The dimensions and engaging members can be varied to accommodate differing sizes and shapes of tape cartridge packs.

We claim:

1. A mobile cart for transporting tape cartridge packs, said mobile cart comprising:
 a base;
 a plurality of wheels mounted on said base;
 a housing unit mounted on said base;
 said housing unit having a top surface, a bottom surface and a plurality of side surfaces;
 compartments formed in said side surfaces of said housing unit; and
 a first elongated engaging member extending across the rear portion of each of said compartments and extending at an acute angle upward and outward from said rear portion of each of said compartments for engaging a slot formed in the rear portion of a tape cartridge pack to securely hold a tape cartridge pack in each of said compartments.

2. The mobile cart of claim 1 wherein said mobile cart includes:
 means for rotatably mounting said housing unit on said base; and
 said compartments are mounted in each of said plurality of surfaces for engaging and supporting tape cartridge packs in each of said compartments.

3. The mobile cart of claim 1 wherein said mobile cart further includes:
 means for guiding the tape cartridge storage packs into engagement with respective first elongated engaging members.

4. The mobile cart of claim 1 wherein said mobile cart further includes:
 an upper angular surface on each of said compartments for guiding a tape cartridge storage pack into engagement with said elongated engaging member.

5. The mobile cart of claim 1 wherein said mobile cart further includes:
 slots formed in said housing unit spaced from one another to engage the ends of retaining straps used with the tape cartridge packs.

6. The mobile cart of claim 1 wherein each of said compartments includes:
 a second elongated engagement member spaced from and parallel to said first elongated engaging member extending across the rear portion and extending at an acute angle upward from said rear portion of said compartment for engaging a slot formed in a tape cartridge pack.

7. The mobile cart of claim 1 wherein each of said compartments includes:
 means for supporting a plurality of tape cartridge packs within each of said compartments.

8. A storage carousel for storing tape cartridge storage packs, said storage carousel comprising:
 a base;
 a housing unit rotatably mounted on said base;
 a top surface, a bottom surface and a plurality of side surfaces on said housing unit;
 compartments formed in each of said side surfaces; and
 a first elongated engaging member extending across the rear portion of each of said compartments and extending at an acute angle upward and outward from said rear portion of each of said compartments for engaging a slot formed in the rear portion of a tape cartridge pack to securely hold a tape cartridge pack in each of said compartments.

9. The storage carousel of claim 8 wherein said storage carousel further includes:
 means for guiding the tape cartridge storage packs into engagement with respective first elongated engaging members.

10. The storage carousel of claim 8 wherein said storage carousel further includes:
 an upper angular surface on each of said compartments for guiding a tape cartridge storage pack into engagement with said first elongated engaging member.

11. The storage carousel of claim 8 wherein each of said compartments include:
   a second elongated member spaced from and parallel to said first elongated member extending across the rear portion of said compartment and extending at an acute angle upward from said rear portion for engaging a slot formed in a tape cartridge pack.

12. The storage carousel of claim 8 wherein each of said compartments include:
   means for supporting a plurality of tape cartridge packs within said compartment.

13. The storage carousel of claim 8 wherein said storage carousel further includes:
   wheels mounted on said base for movement of said storage carousel.

* * * * *